United States Patent
Cannon et al.

(10) Patent No.: US 6,996,259 B2
(45) Date of Patent: Feb. 7, 2006

(54) SYSTEM AND METHOD FOR COUNTING RIDGES IN A CAPTURED PRINT IMAGE

(75) Inventors: Gregory L. Cannon, Boynton Beach, FL (US); David C. Smith, Tequesta, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 27 days.

(21) Appl. No.: 10/631,899

(22) Filed: Aug. 1, 2003

(65) Prior Publication Data

US 2004/0109590 A1 Jun. 10, 2004

Related U.S. Application Data

(60) Provisional application No. 60/400,103, filed on Aug. 2, 2002.

(51) Int. Cl.
*G06K 9/00* (2006.01)

(52) U.S. Cl. ........................ 382/125; 356/71; 340/5.53; 902/3

(58) Field of Classification Search ......... 382/115–127; 356/71; 340/5.52–5.53, 5.8–5.83; 902/3, 902/5
See application file for complete search history.

(56) References Cited

U.S. PATENT DOCUMENTS 2,500,017 A    3/1950    Altman 3,200,701 A    8/1965    White
3,475,588 A    10/1969   McMaster (Continued)

FOREIGN PATENT DOCUMENTS

| EP | 0 101 772 A1 | 3/1984 |
| EP | 0 308 162 A2 | 3/1989 |
| EP | 0 308 162 A3 | 3/1989 |

(Continued)

OTHER PUBLICATIONS

International Search Report for International Application No. PCT/US03/23961 mailed on May 27, 2004, 5 pages.

Btt (Biometric Technology Today), Finger technologies contacts, 2 pages.

Drake, M.D. et al., "Waveguide hologram fingerprint entry device," *Optical Engineering*, vol. 35, No. 9, Sep. 1996, pp. 2499–2505.

(Continued)

*Primary Examiner*—Jon Chang
*Assistant Examiner*—Charles Kim
(74) *Attorney, Agent, or Firm*—Sterne, Kessler, Goldstein & Fox PLLC

(57) ABSTRACT

A system and method for counting ridges in a captured print image frame is described. A pixel path through the captured print image frame is traversed. A hysteresis band for the pixel path is determined. A number of crossings of the determined hysteresis band is counted while traversing the pixel path. A number of print ridges based on the counted number of hysteresis band crossings is determined.

31 Claims, 9 Drawing Sheets

U.S. PATENT DOCUMENTS

| | | |
|---|---|---|
| 3,482,498 A | 12/1969 | Becker |
| 3,495,259 A | 2/1970 | Rocholl et al. |
| 3,527,535 A | 9/1970 | Monroe |
| 3,540,025 A | 11/1970 | Levin et al. |
| 3,617,120 A | 11/1971 | Roka |
| 3,699,519 A | 10/1972 | Campbell |
| 3,906,520 A | 9/1975 | Phillips |
| 3,947,128 A | 3/1976 | Weinberger et al. |
| 3,968,476 A | 7/1976 | McMahon |
| 3,975,711 A | 8/1976 | McMahon |
| 4,032,975 A | 6/1977 | Malueg et al. |
| 4,063,226 A | 12/1977 | Kozma et al. |
| 4,120,585 A | 10/1978 | DePalma et al. |
| 4,152,056 A | 5/1979 | Fowler |
| 4,209,481 A | 6/1980 | Kashiro et al. |
| 4,210,899 A | 7/1980 | Swonger et al. |
| 4,253,086 A | 2/1981 | Szwarcbier |
| 4,322,163 A | 3/1982 | Schiller |
| 4,414,684 A | 11/1983 | Blonder |
| 4,537,484 A | 8/1985 | Fowler et al. |
| 4,544,267 A | 10/1985 | Schiller |
| 4,553,837 A | 11/1985 | Marcus |
| 4,601,195 A | 7/1986 | Garritano |
| 4,669,487 A | 6/1987 | Frieling |
| 4,681,435 A | 7/1987 | Kubota et al. |
| 4,684,802 A | 8/1987 | Hakenewerth et al. |
| 4,701,772 A | 10/1987 | Anderson et al. |
| 4,783,823 A | 11/1988 | Tasaki et al. |
| 4,784,484 A | 11/1988 | Jensen |
| 4,792,226 A | 12/1988 | Fishbine et al. |
| 4,811,414 A | 3/1989 | Fishbine et al. |
| 4,876,726 A | 10/1989 | Capello et al. |
| 4,905,293 A | 2/1990 | Asai et al. |
| 4,924,085 A | 5/1990 | Kato et al. |
| 4,933,976 A | 6/1990 | Fishbine et al. |
| 4,942,482 A | 7/1990 | Kakinuma et al. |
| 4,946,276 A | 8/1990 | Chilcott |
| 4,995,086 A | 2/1991 | Lilley et al. |
| 5,054,090 A | 10/1991 | Knight et al. |
| 5,067,162 A | 11/1991 | Driscoll, Jr. et al. |
| 5,067,749 A | 11/1991 | Land |
| 5,131,038 A | 7/1992 | Puhl et al. |
| 5,146,102 A | 9/1992 | Higuchi et al. |
| 5,157,497 A | 10/1992 | Topper et al. |
| 5,185,673 A | 2/1993 | Sobol |
| 5,187,747 A | 2/1993 | Capello et al. |
| 5,210,588 A | 5/1993 | Lee |
| 5,222,152 A | 6/1993 | Fishbine et al. |
| 5,222,153 A | 6/1993 | Beiswenger |
| 5,230,025 A | 7/1993 | Fishbine et al. |
| 5,233,404 A | 8/1993 | Lougheed et al. |
| 5,249,370 A | 10/1993 | Stanger et al. |
| 5,253,085 A | 10/1993 | Maruo et al. |
| 5,261,266 A | 11/1993 | Lorenz et al. |
| 5,285,293 A | 2/1994 | Webb et al. |
| 5,291,318 A | 3/1994 | Genovese |
| D348,445 S | 7/1994 | Fishbine et al. |
| 5,351,127 A | 9/1994 | King et al. |
| D351,144 S | 10/1994 | Fishbine et al. |
| 5,363,318 A | 11/1994 | McCauley |
| 5,384,621 A | 1/1995 | Hatch et al. |
| 5,412,463 A | 5/1995 | Sibbald et al. |
| 5,416,573 A | 5/1995 | Sartor, Jr. |
| 5,448,649 A | 9/1995 | Chen et al. |
| 5,467,403 A | 11/1995 | Fishbine et al. |
| 5,469,506 A | 11/1995 | Berson et al. |
| 5,471,240 A | 11/1995 | Prager et al. |
| 5,473,144 A | 12/1995 | Mathurin, Jr. |
| 5,483,601 A | 1/1996 | Faulkner |
| 5,509,083 A | 4/1996 | Abtahi et al. |
| 5,517,528 A | 5/1996 | Johnson |
| 5,528,355 A | 6/1996 | Maase et al. |
| 5,548,394 A | 8/1996 | Giles et al. |
| 5,591,949 A | 1/1997 | Bernstein |
| 5,596,454 A | 1/1997 | Hebert |
| 5,598,474 A | 1/1997 | Johnson |
| 5,613,014 A | 3/1997 | Eshera et al. |
| 5,615,277 A | 3/1997 | Hoffman |
| 5,625,448 A | 4/1997 | Ranalli et al. |
| 5,640,422 A | 6/1997 | Johnson |
| 5,649,128 A | 7/1997 | Hartley |
| 5,650,842 A | 7/1997 | Maase et al. |
| 5,661,451 A | 8/1997 | Pollag |
| 5,680,205 A | 10/1997 | Borza |
| 5,689,529 A | 11/1997 | Johnson |
| 5,717,777 A | 2/1998 | Wong et al. |
| 5,729,334 A | 3/1998 | Van Ruyven |
| 5,736,734 A | 4/1998 | Marcus et al. |
| 5,745,684 A | 4/1998 | Oskouy et al. |
| 5,748,766 A | 5/1998 | Maase et al. |
| 5,748,768 A | 5/1998 | Sivers et al. |
| 5,755,748 A | 5/1998 | Borza |
| 5,757,278 A | 5/1998 | Itsumi |
| 5,767,989 A | 6/1998 | Sakaguchi |
| 5,778,089 A | 7/1998 | Borza |
| 5,781,647 A | 7/1998 | Fishbine et al. |
| 5,793,218 A | 8/1998 | Oster et al. |
| 5,801,681 A | 9/1998 | Sayag |
| 5,805,777 A | 9/1998 | Kuchta |
| 5,809,172 A | 9/1998 | Melen |
| 5,812,067 A | 9/1998 | Bergholz et al. |
| 5,815,252 A | 9/1998 | Price-Francis |
| 5,818,956 A | 10/1998 | Tuli |
| 5,822,445 A | 10/1998 | Wong |
| 5,825,005 A | 10/1998 | Behnke |
| 5,825,474 A | 10/1998 | Maase |
| 5,828,773 A | 10/1998 | Setlak et al. |
| 5,832,244 A | 11/1998 | Jolley et al. |
| 5,848,231 A | 12/1998 | Teitelbaum et al. |
| 5,855,433 A | 1/1999 | Velho et al. |
| 5,859,420 A | 1/1999 | Borza |
| 5,859,710 A | 1/1999 | Hannah |
| 5,862,247 A | 1/1999 | Fisun et al. |
| 5,867,802 A | 2/1999 | Borza |
| 5,869,822 A | 2/1999 | Meadows, II et al. |
| 5,872,834 A | 2/1999 | Teitelbaum |
| 5,892,599 A | 4/1999 | Bahuguna |
| 5,900,993 A | 5/1999 | Betensky |
| 5,907,627 A | 5/1999 | Borza |
| 5,920,384 A | 7/1999 | Borza |
| 5,920,640 A | 7/1999 | Salatino et al. |
| 5,928,347 A | 7/1999 | Jones |
| 5,942,761 A | 8/1999 | Tuli |
| 5,946,135 A | 8/1999 | Auerswald et al. |
| 5,960,100 A | 9/1999 | Hargrove |
| 5,973,731 A | 10/1999 | Schwab |
| 5,974,162 A | 10/1999 | Metz et al. |
| 5,987,155 A | 11/1999 | Dunn et al. |
| 5,991,467 A | 11/1999 | Kamiko |
| 5,995,014 A | 11/1999 | DiMaria |
| 5,999,307 A | 12/1999 | Whitehead et al. |
| 6,018,739 A | 1/2000 | McCoy et al. |
| 6,023,522 A | 2/2000 | Draganoff et al. |
| 6,038,332 A | 3/2000 | Fishbine et al. |
| 6,041,372 A | 3/2000 | Hart et al. |
| 6,055,071 A | 4/2000 | Kuwata et al. |
| 6,064,398 A | 5/2000 | Ellenby et al. |
| 6,064,753 A | 5/2000 | Bolle et al. |
| 6,064,779 A | 5/2000 | Neukermans et al. |
| 6,072,891 A | 6/2000 | Hamid et al. |
| 6,075,876 A | 6/2000 | Draganoff |

| | | | |
|---|---|---|---|
| 6,078,265 A | 6/2000 | Bonder et al. | |
| 6,088,585 A | 7/2000 | Schmitt et al. | |
| 6,097,873 A | 8/2000 | Filas et al. | |
| 6,104,809 A | 8/2000 | Berson et al. | |
| 6,111,978 A * | 8/2000 | Bolle et al. | 382/125 |
| 6,115,484 A | 9/2000 | Bowker et al. | |
| 6,122,394 A | 9/2000 | Neukermans et al. | |
| 6,144,408 A | 11/2000 | MacLean | |
| 6,150,665 A | 11/2000 | Suga | |
| 6,154,285 A | 11/2000 | Teng et al. | |
| 6,162,486 A | 12/2000 | Samouilhan et al. | |
| 6,166,787 A | 12/2000 | Akins et al. | |
| 6,178,255 B1 | 1/2001 | Scott et al. | |
| 6,195,447 B1 | 2/2001 | Ross | |
| 6,198,836 B1 | 3/2001 | Hauke | |
| 6,204,331 B1 | 3/2001 | Sullivan et al. | |
| 6,212,290 B1 * | 4/2001 | Gagne et al. | 382/125 |
| 6,259,108 B1 | 7/2001 | Antonelli et al. | |
| 6,272,562 B1 | 8/2001 | Scott et al. | |
| 6,281,931 B1 | 8/2001 | Tsao et al. | |
| 6,327,047 B1 | 12/2001 | Motamed | |
| 6,347,163 B2 | 2/2002 | Roustaei | |
| 2002/0021827 A1 * | 2/2002 | Smith | 382/124 |
| 2002/0030668 A1 | 3/2002 | Hoshino et al. | |

FOREIGN PATENT DOCUMENTS

| | | |
|---|---|---|
| EP | 0 379 333 A1 | 7/1990 |
| EP | 0 623 890 A3 | 11/1994 |
| EP | 0 623 890 A2 | 11/1994 |
| EP | 0 653 882 A1 | 5/1995 |
| EP | 0 379 333 B1 | 7/1995 |
| EP | 0 889 432 A2 | 1/1999 |
| EP | 0 889 432 A3 | 1/1999 |
| EP | 0 905 646 A1 | 3/1999 |
| EP | 0 785 750 B1 | 6/1999 |
| EP | 0 924 656 A2 | 6/1999 |
| EP | 0 623 890 B1 | 8/2001 |
| GB | 2 089 545 A | 6/1982 |
| GB | 2 313 441 A | 11/1997 |
| JP | 62-212892 A | 9/1987 |
| JP | 1-205392 A | 8/1989 |
| JP | 3-161884 A | 7/1991 |
| JP | 3-194674 A | 8/1991 |
| JP | 3-194675 A | 8/1991 |
| JP | 11-225272 A | 8/1999 |
| JP | 11-289421 A | 10/1999 |
| WO | WO 87/02491 A1 | 4/1987 |
| WO | WO 87/06378 * | 10/1987 |
| WO | WO 90/03620 A1 | 4/1990 |
| WO | WO 92/11608 A1 | 7/1992 |
| WO | WO 94/22371 A3 | 10/1994 |
| WO | WO 94/22371 A2 | 10/1994 |
| WO | WO 96/17480 A3 | 6/1996 |
| WO | WO 96/17480 A2 | 6/1996 |
| WO | WO 97/29477 A1 | 8/1997 |
| WO | WO 97/41528 A1 | 11/1997 |
| WO | WO 98/09246 A1 | 3/1998 |
| WO | WO 98/12670 A1 | 3/1998 |
| WO | WO 99/12123 A1 | 3/1999 |
| WO | WO 99/26187 A1 | 5/1999 |
| WO | WO 99/40535 A1 | 8/1999 |

OTHER PUBLICATIONS

Roethenbaugh, G. (ed.), *Biometrics Explained,* 1998, ICSA, pp. 1–34.

*Automated Identification Systems* (visited May 20, 1999) <http://www.trw.com/idsystems/bldgacess2.html>, 1 page, Copyright 1999.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/idcard2.htm>, 2 pages.

*Fujitsu Limited Products and Services* (updated Apr. 21, 1999) <http://www.fujitsu.co.jp/hypertext/Products/index–e.html>, 3 pages, Copyright 1995–1999.

*SonyDCam* (visited May 20, 1999) <http://www.microsoft.com/DDK/ddkdocs/Win2k/sonydcam.htm>, 3 pages, Copyright 1999.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*SAC Technologies Showcases Stand–Alone SAC–Remote(TM)* (visited May 18, 1999) <http://www.pathfinder.com/money/latest/press/PW/1998Mar25/1026.html>, 2 pages.

"Biometrics, The Future Is Now," www.securitymagazine.com, May 1999, pp. 25–26.

*Mytec Technologies Gateway,* (visited Apr. 27, 1999) <http://www.mytec.com/Products/gateway/>, 1 page.

*Mytec Technologies Gateway: Features & Benefits,* (visited Apr. 27, 1999) <http://www.mytec.com/Products/gateway/features.htm>,1 page.

*Mytec Technologies Touchstone Pro,* (visited Apr. 27, 1999) <http://www.mytec.com/Products/Touchstone/>, 1 page.

*Mytec Technologies Touchstone Pro: Features,* (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfs–hr–bene.com/tclocks.html>, 1 page.

*Fingerprint Time Clock* (visited May 17, 1999) <http://www.lfs–hr–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*Intelnet Inc.* (visited May 20, 1999) <http://www.intelgate.com/index.html>, 1 page, Copyright 1996.

*Ver–i–Fus Fingerprint Access Control System* (visited May 20, 1999) <http://www.intelgate.com/verifus.htm>, 2 pages. (Ver–i–fus product released in 1995).

*Ver–i–fus® Configurations* (visited May 20, 1999) <http://www.intelgate.com/verconfig.htm>, 1 page. (Ver–i–fus product released in 1995).

*Ver–i–Fus® & Ver–i–Fus$^{mil}$®* (visited May 20, 1999) <http://www.intelgate.com/vif_data.htm>, 3 pages.(Ver–i–fus product released in 1995).

*Access Control System Configurations* (visited May 20, 1999) <http://www.intelgate.com/access.htm>, 2 pages. (Ver–i–fus product released in 1995).

*Company* (visited May 17, 1999) <http://www.instainfo.com.company.htm>, 2 pages.

*TouchLock™ II Fingerprint Identity Verification Terminal* (visited May 17, 1999). <http://www.identix.com/TLock.htm>, 4 pages.

*Physical Security and Staff Tracking Solutions* (visited May 17, 1999) <http://www.identix.com/products/biosecurity.html>, 3 pages, Copyright 1996–1998.

*Veriprint2000 Fingerprint Verification Terminal For Use With Jantek Time & Attendance Software* (visited May 17, 1999) <http://www.hunterequipment.com/fingerprint.htm>, 2 pages.

*Veriprint Product Applications* (visited Apr. 27, 1999) <http://www.biometricid.com/uses.htm>, 1 page, Copyright 1999.

*BII Home Page* (visited Apr. 27, 1999) <http://www.biometricid.com/homepage.htm>, 1 page, Copyright 1999.

*Veriprint 2100 Stand–Alone Fingerprint Verification Terminal* (visited Apr. 27, 1999) <http://www.biometricid.com/veriprint2100.htm>, 3 pages.

Randall, N. "A Serial Bus on Speed," *PC Magazine*, May 25, 1999, pp. 201–203.

*The DERMALOG Check–ID* (visited Nov. 12, 1999) <http://www.dermalog.de/ganzneu/products_check.html>, 1 page.

*Check–ID Specifications and Features* (visited Nov. 12, 1999) <http://www.dermalog.de/ganzneu/spec_check.html>, 1 page, Copyright 1999.

*Startek's Fingerprint Verification Products: FingerFile 1050* (visited Oct. 8, 1999) <http://www.startek.com.tw/product/ff1050/ff1050.html>, 3 pages.

*Time is Money!* (visited Jun. 5, 1998) <http://www.iaus.com/afim.htm>, 3 pages.

*LS 1 LiveScan Booking Workstation High Performance Finger & Palm Scanning System* (visited Jun. 4, 1998) <http://www.hbs–jena.com/ls1.htm>, 6 pages, Copyright 1998.

*Welcome to the Homepage of Heimann Biometric Systems GMBH* (visited Jun. 4, 1998) <http://www.hbs–jena.com/>, 1 page, Copyright 1998.

*Heimann Biometric Systems Corporate Overview* (visited Jun. 4, 1998) <http://www.hbs–jena.com/company.htm>, 4 pages, Copyright 1998.

*Remote Access Positive IDentification—raPID* (visited Jun. 3, 1998) <http://www.nec.com/cgl–bin/showproduct.exe?pro. . . emote+Access+Positive+IDentification+%2D+raPID>, 2 pages, Copyright 1997.

*Morpho DigiScan Cellular* (visited Jun. 3, 1998). <http://www.morpho.com/products/law_enforcement/digiscan/cellular.htm>, 2 pages, Copyright 1998.

*A.F.I.S.* (last updated April 2, 1998) <http://www.dermalog.de/afis.htm>, 2 pages.

*Morpho FlexScan Workstation* (visited Jun. 3, 1998). <http://www.morpho.com/products/law_enforcement/flexscan/>, 2 pages, Copyright 1998.

True–ID® The LiveScan with special "ability". . . , 2 pages.

*Printrak International: User List* (visited Jun. 3, 1998) <http://www.printrakinternational.com and links>, 10 pages, Copyright 1996.

*Live–Scan Products: Tenprinter® 1133S* (visited Apr. 23, 1999). <http://www.digitalbiometrics.com/Products/tenprinter.htm>, 4 pages. (Tenprinter 1133S released in 1996).

*TouchPrint™ 600 Live–Scan System* (visited Nov. 17, 1999) <http://www.identix.com/products/livescan.htm>, 4 pages, Copyright 1996–1998.

Systems for Live–Scan Fingerprinting, Digital Biometrics, Inc., 8 pages, Copyright 1998.

DBI FingerPrinter CMS, Digital Biometrics, Inc., 5 pages. (CMS released in 1998).

Fingerscan V20, Identix Incorporated, 1 page, Copyright 1999.

Verid Fingerprint Reader, TSSI, 4 pages.

Response to Request for Information, Cross Match Technologies, Inc., 13 pages, Apr. 14, 1999.

*Startek's Fingerprint Verification Products* (visited Nov. 17, 1999) <http://www.startek.com/tw/product/index.html>, 1 page.

*Introduction to Startek's Fingerprint Verification Products* (visited Nov. 17, 1999) <http://www.startek.com.tw/product/index2.html>, 2 pages.

*Automatic Fingerprint Identification Systems* (visited Nov. 17, 1999) <http://www.sagem.com/en/produit4–en/empreinte–dig–en.htm>, 1 page.

*Digital Biometrics Corporate Information* (visited Nov. 17, 1999) <http://www.digitalbiometrics.com/Corporate_info/Corporate_info.htm>, 2 pages. (discusses technology as early as 1985).

*DBI Live–Scan Products: Digital Biometrics Tenprinter* (visited Nov. 17, 1999) <http://www.digitalbiometrics.com/products/tenprinter.htm>, 4 pages. (Tenprinter released in 1996).

*DBI Live–Scan Products: Networking Options* (Visited Nov. 17, 1999) <http://www.digitalbiometrics.com/products/networking_options.htm>, 3 pages.

*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).

*DBI Live–Scan Products: Image Printer Stations* (visited Nov. 17, 1999) <http://www.digitalbiometrics.com/products/imageprinter.htm>, 2 pages.

*DBI Live–Scan Products: FC–21 Fingerprint Capture Station* (visited Nov. 17, 1999) <http://www.digitalbiometrics.com/products/Fingerprintcapture.htm>, 2 pages.

*Series 400 OEM Scanner* (visited Nov. 17, 1999) <http://www.ultra–scan.com/400.htm>, 3 pages. (Scanner released in 1996).

*USC Scanner Design* (visited Nov. 17, 1999) <http://www.ultra–scan.com/scanner.htm>, 4 pages. (Scanner released in 1996).

*Series 500/600 Scanners* (visited Nov. 17, 1999) <http://www.ultra–scan.com/500.htm>, 3 pages. (Scanner released in 1996).

*Series 700 ID Station* (visited Nov. 17, 1999) <http://www.ultra–scan.com/700.htm>, 3 pages. (Scanner released in 1998).

*Identix: The Corporation* (visited Nov. 17, 1999) <http://www.identix.com/corporate/home.htm>, 2 pages, Copyright 1996–1998.

*Biometric Imaging Products* (visited Nov. 17, 1999) <http://www.identix.com/products/bioimage.htm>, 1 page, Copyright 1996–1998.

*TouchPrint™ 600 Live–Scan System* (visited Apr. 23, 1999) <http://www.identix.com/products/livescan.htm>, 4 pages, Copyright 1996–1998.

*TouchPrint™ 600 Palm Scanner* (visited Nov. 17, 1999) <http://www.identix.com/products/palmscan.htm>, 3 pages, Copyright 1996–1998.

*TouchPrint™ 600 Card Scan System* (visited Nov. 17, 1999) <http://www.identix.com/products/cardscan.htm>, 3 pages, Copyright 1996–1998.

*DERMALOG Key—The safest and easiest way of access control* (Last updated Jul. 18, 1998) <http://www.dermalog.de/Britain/Products/Key/key.htm>, 1 page.
*DERMALOG Finger–ID Your small size solution for high security* (Last updated Jul. 18, 1998) <http://www.dermalog.de/Britain/Products/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main–FPB.html>, 1 page.
*Fingerprint Biometrics: Securing The Next Generation*, May 19, 1999, (visited Nov. 17, 1999) <http://www.secugen.com/pressrel.htm>, 2 pages.
*Secugen Unveils Fully Functional Fingerprint Recognition Solutions*, May 11, 1999, (visited Nov. 17, 1999) <http://www.secugen.com/pressrel.htm>, 3 pages.
*POLLEX Technology Ltd., The Expert in Fingerprint Identification—POLLog* (visited Nov. 17, 1999) <http://www.pollex.ch/english/products/pollog.htm>, 2 pages.
*Sony Fingerprint Identification Terminal* (visited Nov. 17, 1999). <http://www.iosoftware.com/biosols/sony/fiu/applications.fit100.htm>, 2 pages.
*Sony Fingerprint Identification Unit (FIU–700)* (visited Nov. 17, 1999). <http://www.iosoftware.com/biosols/sony/fiu70/index.htm>, 2 pages. (Unit available late 1999).
*Sony Fingerprint Indentification Unit* (visited Nov. 17, 1999). <http://www.iosoftware.com/biosols/sony/fiu/index.htm>, 3 pages.
*Fujitsu Fingerprint Recognition Device (FPI–550)* (visited Nov. 17, 1999). <http://www.iosoftware.com/biosols/fujitsu/fpi550.htm>, 2 pages.
*Mitsubishi MyPass LP–1002* (visited Nov. 17, 1999). <http://www.iosoftware.com/biosols/mitsubishi/mypass.htm>, 2 pages.
*SecureTouch PV—A Personal Password Vault* (visited Nov. 17, 1999) <http://www.biometricacess.com/securetouch_pv.htm>, 1 page.
*Digital Descriptor Systems, Inc.–Profile* (visited Nov. 17, 1999) <http://www.ddsi–cpc.com/pages/profile.html>, 3 pages.
*Press Release: Printrak International Announces New Portable Fingerprint ID Solution*, Dec. 10, 1996, (visited Nov. 17, 1999) <http://www.scott.net/~dg/25.htm>, 3 pages.
*Corporate Profile* (visited Nov. 17, 1999) <http://www.printrakinternational.com/corporate.htm>, 1 page.
*Printrak Products* (visited Nov. 17, 1999). <http://www.printrakinternational.com/Products.htm>, 1 page. (Discuss technology as early as 1974).
Verifier™ 200 Fingerprint Capture Devices, Cross Match Technologies, Inc., 2 pages, 1996–1997.
Verifier 200 Direct Fingerprint Reader, Cross Check Corporation, 2 pages, 1996–1997.
Verifier™ 250 Fingerprint Capture Devices, Cross Match Technologies, Inc., 2 pages, 1996–1997.
Verifier 250 Small Footprint Direct Fingerprint Reader, Cross Check Corporation, 2 pages, 1996–1997.
Verifier™ 290 Fingerprint Capture Devices, Cross Match Technologies, Inc., 2 pages, 1996–1997.
Verifier 290 Direct Rolled Fingerprint Reader, Cross Check Corporation, 2 pages, 1996–1997.
Verifier™ 500 Fingerprint Capture Devices, Cross Match Technologies, Inc., 2 pages, 1998.
Biometric terminal, 1 page.
10–Print Imaging System, Cross Check Corporation, 2 pages, 1998.
*Cross Match Technologies. Inc.* (visited Mar. 25, 1999) <http://www.crossmatch.net/>, 1 page.
*Cross Match Technologies, Inc. —Products Overview* (visited Mar. 25, 1999) <http://www.crossmatch.net/new/products/products–index.html>, 1 page.
*Cross Match Technologies, Inc.—Law Enforcement Systems* (visited Mar. 25, 1999) <http://www.crossmatch.net/new/law/law–index.html>, 2 pages.
*Cross Match Technologies, Inc.—Commercial Systems: Building On The Standard* (visited Mar. 25, 1999) <http://www.crossmatch.net/new/commercial/commercial–index.html>, 2 pages.
*Cross Match Technologies, Inc. —International Sales* (visited Mar. 25, 1999) <http://www.crossmatch.net/new/sales/sales–index.html>, 1 page.
*Cross Match Technologies, Inc.—Support* (visited Mar. 25, 1999) <http://www.crossmatch.net/new/support/support–index.html>, 1 page.
*Cross Match Technologies, Inc.—News—Press Releases— Verifier 400 Press Release* (visited Mar. 25, 1999) <http://www.crossmatch.net/new/news/news–pr–050798.html>, 1 page.
*Global Security Fingerscan™ System Overview* (visited Jan. 11, 2000). <http://wwwu–net.com/mbp/sol/g/a9.htm>, 12 pages.
"Command Structure for a Low–Cost (Primitive) Film Scanner," *IBM Technical Disclosure Bulletin*, IBM Corp., vol. 35, No. 7, Dec. 1992, pp. 113–121.
*Fingerprint Scan API Toolkit Version 1.x Feature List* (Apr. 26, 2000) <http://www.mentalix.com/api/archive_fapivl.htm>, 3 pages.
"Image Acquisition System," *IBM Technical Disclosure Bulletin*, IBM Corp., vol. 29, No. 5, Oct. 1986, pp. 1928–1931.
Kunzman, Adam J. and Wetzel, Alan T., "1394 High Performance Serial Bus: The Digital Interface for ATV," *IEEE Transaction on Consumer Electronics*, IEEE, vol. 41, No. 3, Aug. 1995, pp. 893–900.
*Mentalix Provides The First IAFIS–Certified Latent Print Scanning Solution For Windows ®* (Jul. 23, 1999) <http://www.mentalix.com/pressreleases/fprintlook3_prel.htm>, 2 pages.
Sluijs, F. et al., "An On–chip USB–powered Three–Phase Up/down DC/DC Converter in a Standard 3.3V CMOS Process," *2000 IEEE International Solid–State Circuits Conference*, IEEE, Feb. 9, 2000, pp. 440–441.
Venot, A. et al., "Automated Comparison of Scintigraphic Images," *Journal of Nuclear Medicine*, vol. 27, No. 8, Aug. 1986, pp. 1337–1342.
English–language Abstract for Japanese Patent Publication No. 59–103474, published Jun. 14, 1984, printed from espacenet.com, 1 page.
English–language Abstract for Japanese Patent Publication No. 62–212892, published Sep. 16, 1987, printed from espacenet.com, 1 page.
English–language Abstract for Japanese Patent Publication No. 1–205392, published Aug. 17, 1989, printed from espacenet.com, 1 page.
English–language Abstract for Japanese Patent Publication No. 3–161864, published Jul. 11, 1991, printed from espacenet.com, 1 page.

English–language Abstract for Japanese Patent Publication No. 3–194674, published Aug. 26, 1991, printed from espacenet.com, 1 page.

English–language Abstract for Japanese Patent Publication No. 3–194675, published Aug. 26, 1991, printed from espacenet.com, 1 page.

English–language Abstract for Japanese Patent Publication No. 10–079017, published Mar. 24, 1998, printed from espacenet.com, 1 page.

English–language Abstract for Japanese Patent Publication No. 10–262071, published Sep. 29, 1998, printed from espacenet.com, 1 page.

English–language Abstract for Japanese Patent Publication No. 11–167630, published Jun. 22, 1999, printed from espacenet.com, 1 page.

English–language Abstract for Japanese Patent Publication No. 11–225272, published Aug. 17, 1999, printed from espacenet.com, 1 page.

English–language Abstract for Japanese Patent Publication No. 11–252489, published Sep. 17, 1999, printed from espacenet.com, 1 page.

English–language Abstract for Japanese Patent Publication No. 11–289421, published Oct. 19, 1999, printed from espacenet.com, 1 page.

* cited by examiner

SYSTEM AND METHOD FOR COUNTING RIDGES IN A CAPTURED PRINT IMAGE

CROSS-REFERENCE TO RELATED APPLICATIONS

This application claims the benefit of U.S. Provisional Application No. 60/400,103, filed Aug. 2, 2002, which is herein incorporated by reference in its entirety.

BACKGROUND OF THE INVENTION

1. Field of the Invention

The invention relates generally to the field of fingerprint scanner technology and, more particularly, to counting ridges in a captured fingerprint image frame.

2. Background Art

Biometrics are a group of technologies that provide a high level of security. Fingerprint capture and recognition is an important biometric technology. Law enforcement, banking, voting, and other industries increasingly rely upon fingerprints as a biometric to recognize or verify identity. See, *Biometrics Explained*, v. 2.0, G. Roethenbaugh, International Computer Society Assn. Carlisle, Pa. 1998, pages 1–34 (incorporated herein by reference in its entirety).

Fingerprint scanners having cameras are available that capture an image of a fingerprint. Typically, to capture a fingerprint image electronically with a fingerprint scanner, a light source is directed towards a fingerprint capture surface that reflects light from the light source towards a camera. The fingerprint capture surface is generally glass. Contact between the surface of a finger and the fingerprint capture surface causes the reflected light to be representative of the fingerprint of the particular finger placed against the fingerprint capture surface. This reflected light is then captured by camera. The fingerprint scanner may have processing that produces a signal representative of a captured fingerprint image from the reflected light.

The quality of contact between a finger and the fingerprint capture surface plays a large role in the intensity of the reflected light. A very dry skin surface on a clean fingerprint capture surface may result in a low intensity level of reflected light. On the other hand, an oily skin surface and/or a less-clean fingerprint capture surface may result in a high level of reflected light. Additional factors, such as the location of the finger, the pressure applied to press the finger to the platen, and the ambient environment may affect whether an acceptable quality fingerprint image is captured.

As a result of the above variations, a fingerprint scanner system and method that captures an acceptable fingerprint image is needed. Moreover, a system and method for determining the quality of a captured fingerprint image is desired.

BRIEF SUMMARY OF THE INVENTION

A system and method for counting fingerprint ridges in a captured fingerprint image frame is described. In an aspect of the present invention, a fingerprint image is captured. The captured fingerprint image is stored. A region of interest in the stored fingerprint image frame is determined. A pixel path is determined through the region of interest.

In a further aspect, the pixel path through the captured fingerprint image frame is traversed. A hysteresis band for the pixel path is determined. A number of crossings of the determined hysteresis band is counted while traversing the pixel path. A number of fingerprint ridges based on the counted number of hysteresis band crossings is determined.

In a further aspect, the determined number of fingerprint ridges is stored.

In a further aspect, the stored number of fingerprint ridges is evaluated to determine a quality of the captured fingerprint image.

In a further aspect, a plurality of pixel paths may be determined, and individually traversed.

In an aspect of the present invention, the hysteresis band is defined by a hysteresis band first edge value and a hysteresis band second edge value. The hysteresis band may be determined as follows: A first ridge pixel value peak for the determined pixel path is measured. A first valley pixel value peak for the determined pixel path is measured. A hysteresis band center pixel value between the first ridge pixel value peak and the first valley pixel value peak is selected. The hysteresis band first edge value is calculated by adding a delta value to the selected hysteresis band center pixel value. The hysteresis band second edge value is calculated by subtracting the delta value from the selected hysteresis band center pixel value.

In a further aspect, the hysteresis band center pixel value may be selected by calculating an average pixel value of the first ridge pixel value peak and the first valley pixel value peak, and setting the hysteresis band center pixel value to the calculated average pixel value.

In a further aspect, the delta value may be calculated according to the following equation:

$$\text{delta value} = |(\text{first valley pixel value peak} - \text{first ridge pixel value peak})|/N,$$

wherein N is any number greater than one. For example, N may be an integer, such as six.

In a further aspect, a hysteresis band crossing may be detected when sequentially detected pixel values along the pixel path range from the hysteresis band first edge value to the hysteresis band second edge value. Furthermore, a hysteresis band crossing maybe detected when sequentially detected pixel values along the pixel path range from the hysteresis band second edge value to the hysteresis band first edge value.

In a further aspect, the number of fingerprint ridges based on the counted number of hysteresis band crossings is determined by dividing the counted number of hysteresis band crossings by two.

In another aspect of the present invention, a system is described for counting fingerprint ridges in a captured fingerprint image frame. A ridge counter module traverses a pixel path through the captured fingerprint image frame, determines a hysteresis band for the pixel path, counts a number of crossings of the determined hysteresis band while traversing the pixel path, and determines a number of fingerprint ridges based on the counted number of hysteresis band crossings.

In a further aspect, the system includes a camera that captures a fingerprint image and outputs the captured fingerprint image frame.

In a further aspect, the system includes a memory that stores the captured fingerprint image frame, and is accessible by the ridge counter module.

In a further aspect, the system includes a platen that has a finger application area.

In a further aspect, the system includes an illumination source that provides light to illuminate the finger application area to produce the fingerprint image.

In a further aspect, the system includes an optical system that directs the light to the camera.

In a further aspect, the system includes a controller that includes the ridge counter module and controls the illumination source and/or the camera.

This system and method for counting ridges according to the present invention can be used with any type of print including, but not limited to a print of all or part of a finger, palm, hand, toe, and foot.

Further aspects, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
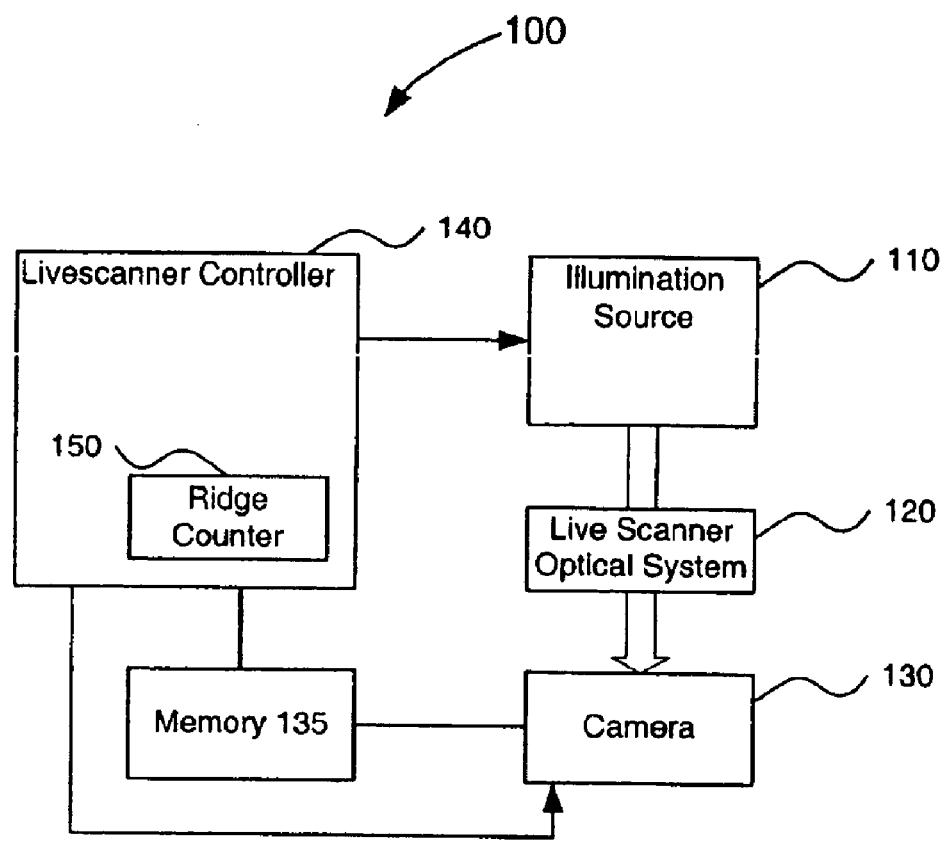
FIG. 1 illustrates an example block diagram of a fingerprint scanner system, according to embodiments of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Overview

The present invention is directed to a method, system, and apparatus for counting ridges in a captured fingerprint image. The present invention may be applied in any type of print scanner, including but not limited to any type of fingerprint and/or palm print scanner.

Numerous embodiments of the present invention are presented herein. Detail on the above mentioned embodiments for counting fingerprint ridges in a captured fingerprint image frame, and additional embodiments according to the present invention, are described. The embodiments described herein may be combined in any applicable manner, as required by a particular application.

Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "live scan" refers to a scan of any type of fingerprint and/or palm print image made by a print scanner. A live scan can include, but is not limited to, a scan of a finger, a finger roll, a flat finger, slap print of four fingers, thumb print, palm print, toe, or foot, or a combination of fingers, such as, sets of fingers and/or thumbs from one or more hands or one or more palms, or one or more toes disposed on a platen.

In a live scan, one or more fingers or palms from either a left hand or a right hand, or both hands or all or part of a foot are placed on a platen of a scanner. Different types of print images are detected depending upon a particular application. For example, a flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A palm print involves pressing all or part of a palm upon the platen. A platen can be movable or stationary depending upon the particular type of scanner and the type of print being captured by the scanner.

The terms "biometric imaging system", "scanner", "live scanner", "live print scanner", "fingerprint scanner" and "print scanner" are used interchangeably, and refer to any type of scanner which can obtain an image of all or part of one or more fingers and/or palm in a live scan. The obtained images can be combined in any format including, but not limited to, an FBI, state, or international ten-print format.

The term "platen" refers to a component that includes an imaging surface upon which at least one finger is placed during a live scan. A platen can include, but is not limited to, a surface of an optical prism, set of prisms, or set of micro-prisms, or a surface of a silicone layer or other element disposed in optical contact with a surface of an optical prism, set of prisms, or set of micro-prisms.

Embodiments for Counting Fingerprint Ridges in a Captured Fingerprint Image Frame Example embodiments for counting fingerprint ridges according to the present invention are described at a high-level and at a more detailed level. These example embodiments are provided herein for illustrative purposes, and are not limiting. In particular, fingerprint ridge counting as described in this section can be achieved using any number of structural implementations, including hardware, firmware, software, or any combination thereof.

FIG. 1 illustrates an example high level block diagram of a live scanner system 100, according to embodiments of the present invention. Live scanner system 100 includes an illumination source 110, a live scanner optical system 120, a camera 130, a memory 135, and a live scanner controller 140. Live scanner system 100 captures a user's print. Furthermore, live scanner system 100 is capable of performing ridge counting according to the present invention.

Live scanner system 100 may be a portion of, or may be included in any suitable type of print scanner, known to persons skilled in the relevant art(s). For example, live scanner system 100 may be included in any live scanner available from Cross Match Technologies, Inc., or other manufacturer. Furthermore, one or more portions of live scanner system 100 maybe incorporated in any computer system that can process captured fingerprint images.

Optical system 120 shown in FIG. 1 includes a fingerprint image capturing platen, where a user may apply a finger. In some embodiments, the fingerprint image capturing platen may allow a user to roll the applied finger across the platen. Illumination source 110 provides light for illuminating the applied finger at the platen. Optical system 120 may focus and direct the light to the platen. Optical system 120 focuses and/or directs light reflected from the applied finger to camera 130. Camera 130 periodically samples the reflected light, and outputs captured fingerprint image data. The data is output to memory 135, which stores the captured fingerprint image data in the form of a captured fingerprint image frame. For example, the captured fingerprint image frame may be stored in the form of a two-dimensional array of pixel data.

Controller 140 accesses the captured fingerprint image data stored in memory 135, and/or directly from camera 130. Controller 140 may provide a sampling signal to camera 130 and/or illumination source 110 that causes camera 130 to capture fingerprint image frames while being illuminated by illumination source 110.

Controller 140 may be included in a personal computer, a mainframe computer, one or more processors, specialized hardware, software, firmware, or any combination thereof, and/or any other device capable of processing the captured fingerprint image data as described herein. Controller 140 may allow a user to initiate and terminate a fingerprint capture session. Controller 140 also allows a user to evaluate the quality of captured fingerprint images, as described below.

As shown in FIG. 1, controller 140 comprises a ridge counter module 150. Ridge counter module 150 counts fingerprint ridges in captured fingerprint image frames. Further structural and operational detail of ridge counter module 150 is provided below. Ridge counter module 150 may be implemented in hardware, firmware, software, or a combination thereof. Other structural embodiments for ridge counter module 150 will be apparent to persons skilled in the relevant art(s) based on the discussion contained herein.

Figure 4:
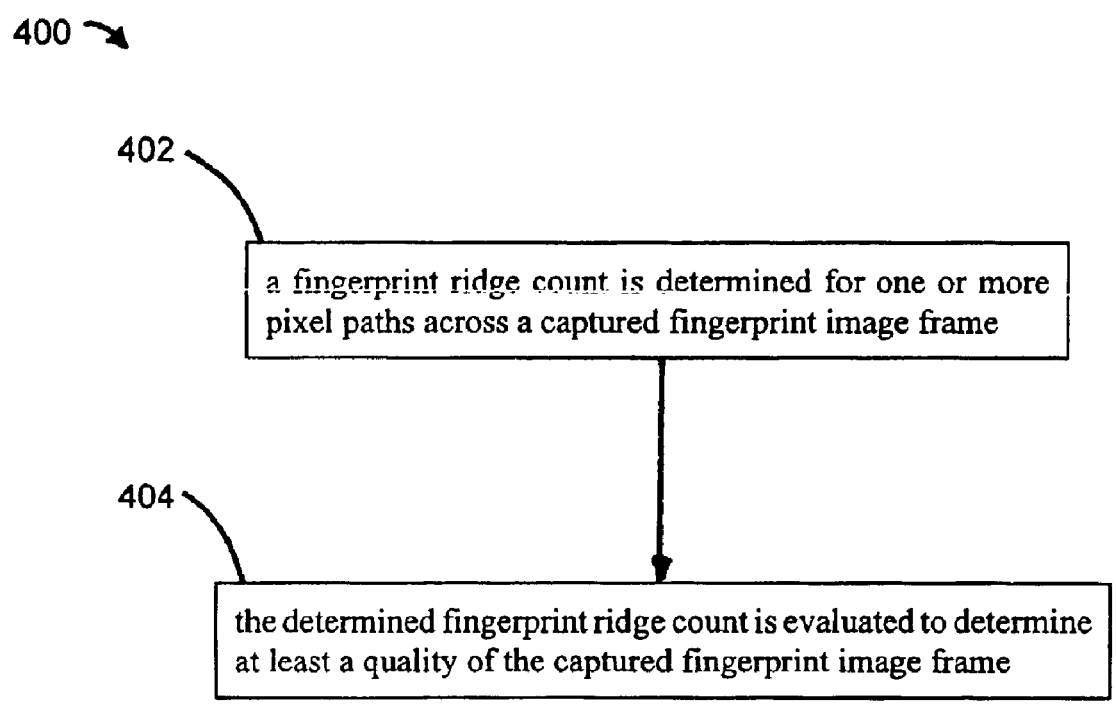
FIG. 4 shows a flowchart providing high level steps for performing the present invention.

FIG. 4 shows a flowchart 400 providing high level steps for the present invention. Operational and structural embodiments related to flowchart 400 will become apparent to persons skilled in the relevant art(s) based on the discussion herein.

Flowchart 400 begins with step 402. In step 402, a fingerprint ridge count is determined for one or more pixel paths across a captured fingerprint image frame. Procedures for determining a fingerprint ridge count according to step 402 are described further below. Step 402 may be performed by live scanner system 100, for example.

In step 404, the determined fingerprint ridge count is evaluated to determine at least a quality of the captured fingerprint image frame. Controller 140 or other processing hardware/software may use the output of ridge counter module 150 for any number of reasons. For example, controller 140 may use a ridge count as a factor in determining whether a quality fingerprint image has been captured. For example, if an unusually low number of ridges are counted, controller 140 may determine that a poor quality fingerprint image was captured. If an expected number of ridges are counted, controller 140 may use this information as a factor indicating that a relatively good quality fingerprint image was captured. A fingerprint ridge count may be used for additional reasons, including evaluating the performance of the corresponding fingerprint scanner, identity verification, and for further reasons.

Figure 5:
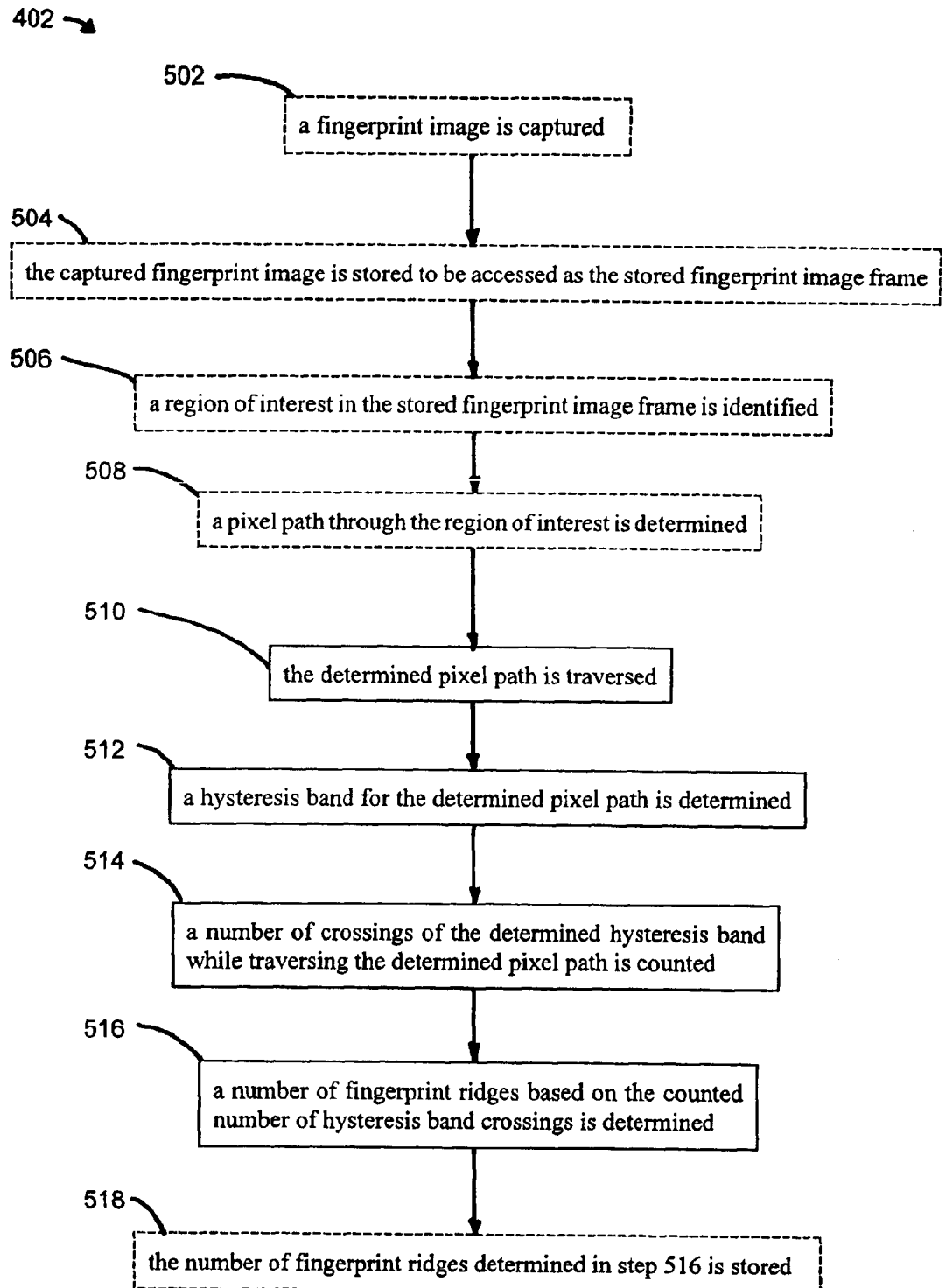
FIG. 5 shows example steps for counting fingerprint ridges in a captured fingerprint image frame, according to embodiments of the present invention.

FIG. 5 shows example steps for performing step 402, according to one or more embodiments of the present invention. Optional steps are shown surrounded by dotted lines in FIG. 5. The steps of FIG. 5 do not necessarily have to occur in the order shown, as will be apparent to persons skilled in the relevant art(s) based on the teachings herein. Operational and structural embodiments will be apparent to persons skilled in the relevant art(s) based on the following discussion In step 502, a fingerprint image is captured.

In step 504, the captured fingerprint image is stored to be accessed as the stored fingerprint image frame.

In step 506, a region of interest in a stored fingerprint image frame is identified.

In step 508, a pixel path through the region of interest is determined.

In step 510, the determined pixel path is traversed.

In step 512, a hysteresis band for the determined pixel path is determined.

In step 514, a number of crossings of the determined hysteresis band while traversing the determined pixel path is counted.

In step 516, a number of fingerprint ridges based on the counted number of hysteresis band crossings is determined.

In step 518, the number of fingerprint ridges determined in step 516 is stored.

The steps shown in FIG. 5 are described in further detail in the following discussion.

Figure 2A:
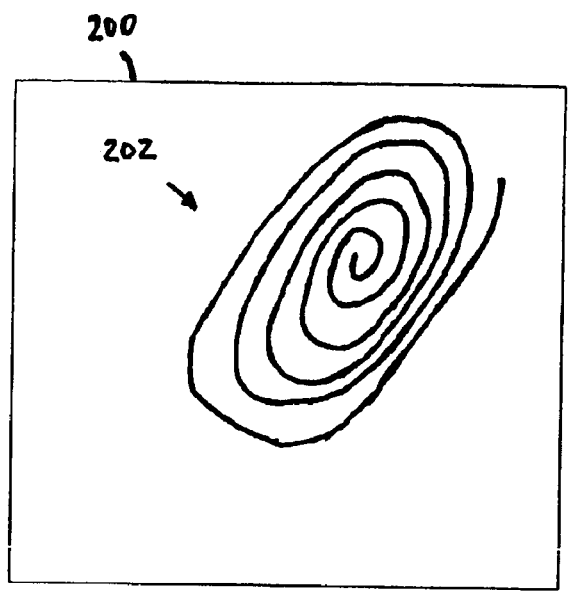
FIG. 2A shows an example captured fingerprint image frame.

In optional step 502 of FIG. 5, a fingerprint image is captured. For example, camera 130 captures a fingerprint image reflected from a finger applied to a platen. FIG. 2D shows an example finger 230 that is applied to a platen 240, according to an embodiment of the present invention. As shown in FIG. 2D, platen 240 is a surface of an optical prism. Finger 230 includes five ridges 260a–260e and four valleys 280a–d, for illustrative purposes. Illumination source 110 emits light to finger 230. A portion of the emitted light from illumination source 110 is shown as first light 270a and second light 270b in FIG. 2D. As shown in FIG. 2D, first light 270a contacts ridge 260a at the surface of platen 240. First light 270a is largely diffused and/or absorbed by finger 230, and does not substantially cause reflected light. Hence, because first light 270a is not substantially reflected from ridge 260a, camera 130 will receive relatively little light, and will output one or more "dark" pixels that correspond to ridge 260a. Conversely, second light 270b contacts space or valley 280c at the surface of platen 240, causing reflected light 290. Second light 270b is relatively less diffused and/or absorbed by finger 230, causing more light to be reflected. Hence, camera 130 receives reflected light 290 and outputs one or more relatively "bright" pixels that correspond to valley 280c.

Note that in this description, ridges are described to cause relatively "dark" reflections, and valleys to cause relatively "bright" reflections. However, in alternative embodiments, this may be reversed. In other words, ridges may instead cause "bright" reflections, while valleys may cause relatively "dark" reflections.

In embodiments, different amounts of light are reflected depending on whether a ridge, valley, or intermediate portion of finger 230 is in contact with a prism. The light captured by the camera may be output as data by the camera in the form of grey-scale pixel intensity values. For example, the grey-scale pixel intensity values may range from 0 to 255, where 0 represents a white pixel, 255 represents a black pixel, and values in between 0 and 255 represent corresponding shades of grey. Alternatively, 0 may represent a black pixel and 255 may represent a white pixel. Furthermore, in alternative embodiments, the pixel intensity values may have greater and lesser ranges than 0 to 255. Furthermore, the pixel intensity values may include shades of one or more colors in addition to black, grey, and white. For illustrative purposes, fingerprint image data is described herein as in the form of pixels with grey-scale pixel intensity values ranging from 0 (white) to 255 (black).

Note that in alternative embodiments, the fingerprint image may have already been captured, and step 502 is therefore not necessary.

In optional step 504, shown in FIG. 5, the captured fingerprint image is stored to be accessed as the stored fingerprint image frame. For example, the captured fingerprint image frame is stored by camera 130 in memory 135. FIG. 2A shows an example stored captured fingerprint image frame 200. Captured fingerprint image frame 200 may have been captured by camera 130 shown in FIG. 1, and stored in memory 135, for example. In an embodiment, captured fingerprint image frame 200 is stored as a two-dimensional array of pixel data. Note that in alternative embodiments, the captured fingerprint image may be prestored, and step 504 is therefore not necessary.

As shown in FIG. 2A, stored captured fingerprint image frame 200 includes a captured fingerprint image 202. Captured fingerprint image 202 is an image captured from a user's finger applied to a corresponding platen. Darker pixel areas of captured fingerprint image 202 represent areas where relatively better contact is made between the user's finger and the platen. The darker pixel areas tend to correspond to ridges of the user's fingerprint. Lighter pixel areas of captured fingerprint 202 represent areas where relatively less contact is made between the user's finger and the platen. The lighter pixel areas tend to correspond to spaces or valleys between ridges of the user's fingerprint.

In optional step 506, shown in FIG. 5, a region of interest in a stored fingerprint image frame is identified. In the embodiment shown in FIG. 1, captured fingerprint image frame 200 is processed by controller 140 to obtain desired information related to the user's fingerprint. All of captured fingerprint image frame 200, or a portion of fingerprint image frame 200 may be considered to be the region of interest. Processing only a portion of fingerprint image frame 200 determined to be a region of interest may save processing time and other resources relative to processing all of fingerprint image frame 200.

Figure 2B:
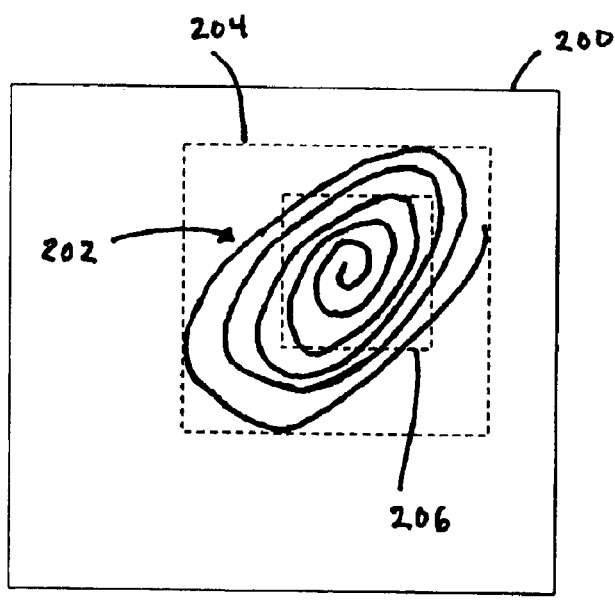
FIG. 2B shows the example captured fingerprint image frame of FIG. 2A with two example fingerprint image frame regions, according to embodiments of the present invention.

For example, FIG. 2B shows an example first fingerprint image frame region 204 and an example second fingerprint image frame region 206, which are each portions of captured fingerprint image frame 200. First fingerprint image frame region 204 is smaller in area than captured fingerprint image frame 200, and therefore includes fewer pixels than captured fingerprint image frame 200. Because first fingerprint image frame region 204 has fewer pixels than captured fingerprint image frame 200, any processing of first fingerprint image frame region 204 may be more efficient than processing captured fingerprint image frame 200. Furthermore, second fingerprint image frame region 206 is smaller in area than first fingerprint image frame region 204, and therefore includes fewer pixels than first fingerprint image frame region 204. Because second fingerprint image frame region 206 has fewer pixels than first fingerprint image frame region 204, any processing of second fingerprint image frame region 206 may be more efficient than processing first fingerprint image frame region 204

For illustrative purposes, in the following example of fingerprint image processing, any processing is described as performed on second fingerprint image frame region 206. However, in embodiments of the present invention, an entire captured fingerprint image frame, or any portion thereof, may be processed.

Figure 2C:
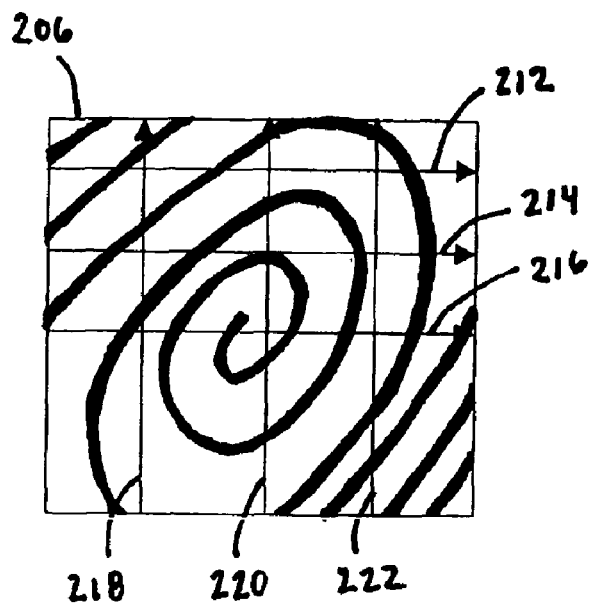
FIG. 2C shows example pixel paths through a captured fingerprint image frame region, according to the present invention.
Figure 2D:
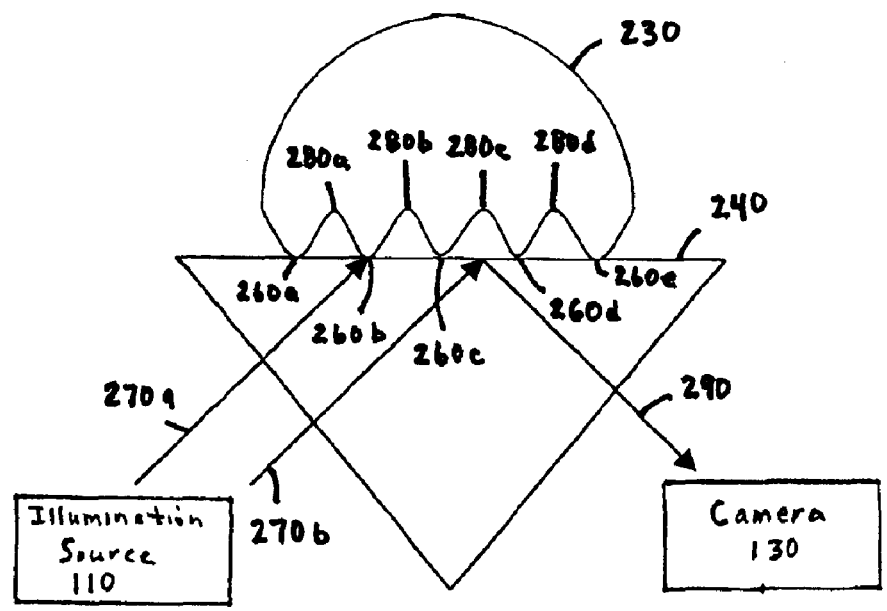
FIG. 2D shows an example finger that is applied to an example platen, according to an embodiment of the present invention.

In optional step 508, shown in FIG. 5, a pixel path through the region of interest is determined. In embodiments, one or more pixel paths through a single captured fingerprint image may be determined. FIG. 2C shows example pixel paths through captured fingerprint image frame region 206, according to the present invention. As shown in the example of FIG. 2C, six pixel paths are present, first horizontal pixel path 212, second horizontal pixel path 214, third horizontal pixel path 216, first vertical pixel path 218, second vertical pixel path 220, and third vertical pixel path 222. Only six paths are shown for clarity; however, in general a fewer or greater number of pixel paths can be used.

Note that in embodiments, pixel paths may be straight horizontal and vertical paths, such as are shown in FIG. 2C, and may be other shaped paths. For example, pixel paths may also be elliptical, triangular, rectangular, other polygons, irregular, and other shaped paths. Furthermore, in alternative embodiments, the one or more pixel paths are predetermined, and are not determined on an application basis. Hence, step 508 is may not be necessary.

In step 510, shown in FIG. 5, the determined pixel path is traversed. According to the present invention, a pixel path is traversed so that the number of fingerprint ridges occurring along the pixel path may be counted. Pixel paths may be traversed in either direction along the pixel path. Typically, a pixel path is traversed by detecting pixel values sequentially along the determined pixel path. During the traversal, a pixel intensity value may be detected for every pixel in the pixel path, for every other pixel in the pixel path, for every third pixel in the pixel path, or for other multiples of pixels in the pixel path.

In the example of FIG. 2C, horizontal pixel paths are traversed from left to right, and the number of ridges occurring along the pixel path are counted during the traversal. During an example traversal of first horizontal pixel path 212, three fingerprint ridges are counted. During an example traversal of second horizontal pixel path 214, four fingerprint ridges are counted. During an example traversal of third horizontal pixel path 216, seven fingerprint ridges are counted. During an example traversal of first vertical pixel path 218, three fingerprint ridges are counted. During an example traversal of second vertical pixel path 220, five fingerprint ridges are counted. During an example traversal of third vertical pixel path 222, three fingerprint ridges are counted. The discussion below describes how to count fingerprint ridges such as these, according to the present invention.

Figure 3:
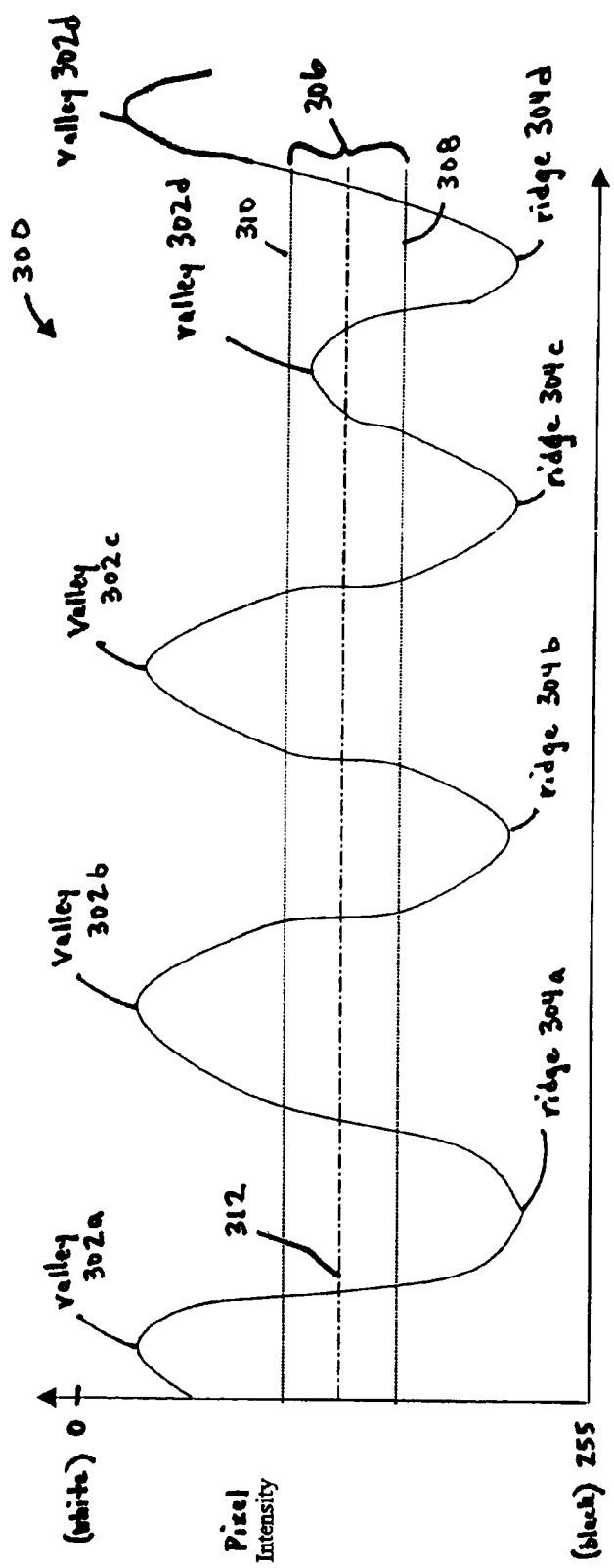
FIG. 3 shows an example plot of pixel intensity for a traversed pixel path.

In step 512, shown in FIG. 5, a hysteresis band for the determined pixel path is determined. According to the present invention, fingerprint ridges are counted using a hysteresis band, as is further described below. FIG. 3 shows an example plot 300 of pixel intensity for a traversed pixel path. Pixel intensity values range from 0 (white) to 255 (black). The pixel path begins at a first end of the pixel path, traversing sequentially through the pixels in the pixel path, to a second end of the pixel path. As shown in FIG. 3, four fingerprint ridges 304a–304d and four fingerprint valleys 302a–302d are present in the captured fingerprint image frame portion during traversal of the pixel path.

Figure 6:
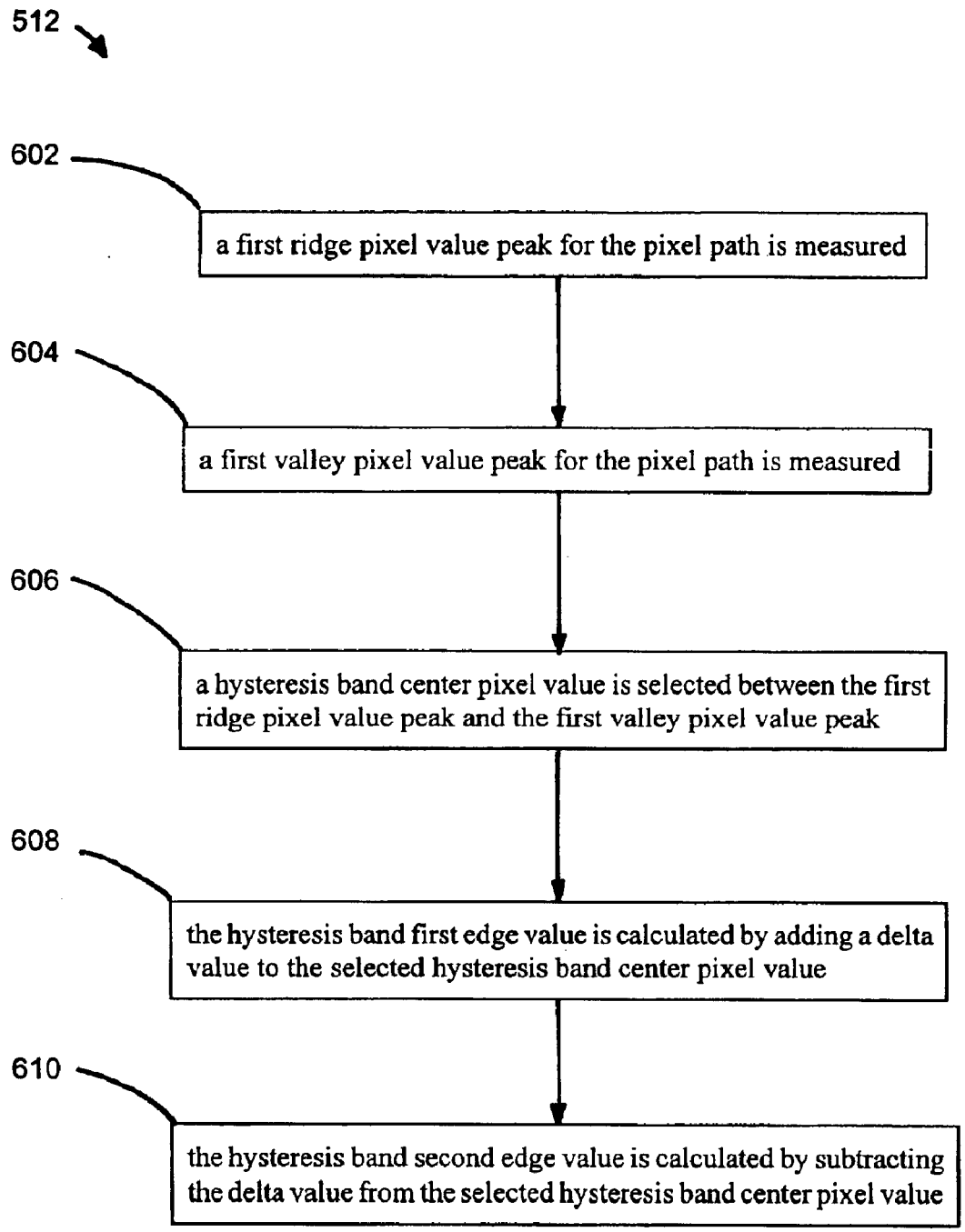
FIG. 6 shows example steps for determining a hysteresis band, according to an embodiment of the present invention.

According to the present invention, a hysteresis band 306, as shown in FIG. 3, is determined. As shown in FIG. 3, hysteresis band 306 is defined by a hysteresis band first edge value 308 and a hysteresis band second edge value 310. FIG. 6 shows example steps for step 512 of FIG. 5, according to one or more embodiments of the present invention. The steps of FIG. 6 do not necessarily have to occur in the order shown, as will be apparent to persons skilled in the relevant art(s) based on the teachings herein. Operational and structural embodiments will be apparent to persons skilled in the relevant art(s) based on the following discussion related to flowchart 600.

Flowchart 600 begins with step 602. In step 602, a first ridge pixel value peak for the pixel path is measured. In other words, for the example of FIG. 3, the pixel path is traversed from left to right, to find a first maximum pixel value for the pixel intensity, which corresponds to a fingerprint ridge peak. In FIG. 3, by traversing the pixel path from left to right, a first ridge pixel value peak is found as the maximum pixel value for first ridge 304a. First ridge 304a is the first ridge found while traversing the pixel path from left to right. For instance, the peak pixel value for first ridge 304a may be equal to a pixel intensity value of 230. In examples, the first ridge pixel value peak can be any selected ridge value peak along the pixel path, an average or mean of the ridge value peaks, or the minimum ridge value peak of a group of ridge value peaks along the pixel path.

In step 604, a first valley pixel value peak for the pixel path is measured. In other words, for the example of FIG. 3, the pixel path is traversed from left to right, to find a first minimum pixel value for the pixel intensity, which corresponds to a fingerprint valley peak. In FIG. 3, by traversing the pixel path from left to right, a first valley pixel value peak is found as the minimum pixel value for first valley 302a. First valley 302a is the first valley found while traversing the pixel path from left to right. For instance, the peak pixel value for first valley 302a may be equal to a pixel intensity value of 30. In examples, the first valley pixel value peak can be any selected valley value peak along the pixel path, an average or mean of the valley value peak, or the maximum valley value peak of a group of valley value peaks along the pixel path.

In step 606, a hysteresis band center pixel value is selected between the first ridge pixel value peak and the first valley pixel value peak. In the example of FIG. 3, the hysteresis band center pixel value is shown as hysteresis band center pixel value 312. Any pixel intensity value between the intensity values of the first ridge pixel value peak and first valley pixel value peak may be chosen to be hysteresis band center pixel value 312. In an embodiment, hysteresis band center pixel value 312 is chosen to be the average value of the first ridge pixel value peak and first valley pixel value peak. In the current example, the average value of the first ridge pixel value peak and first valley pixel value peak is equal to (230−30)/2=130=hysteresis band center pixel value 312.

In step 608, the hysteresis band first edge value is calculated by adding a delta value to the selected hysteresis band center pixel value. Hence, hysteresis band first edge value 308 is equal to the sum of hysteresis band center pixel value 312 and a delta value. In embodiments, the delta value may be predetermined, may be calculated as a fraction or percentage of the difference between the first ridge pixel value peak and the first valley pixel value peak, and maybe calculated in other ways. In an embodiment, the delta value is one-sixth of the difference between the first ridge pixel value peak and the first valley pixel value peak:

delta value=(first ridge pixel value peak−first valley pixel value peak)/6 which in the current example is approximately equal to:

delta value={230−30)/6=33.3.

Hence, in the current example, hysteresis band first edge value 308 is approximately equal to 130+33.3=163.3=hysteresis band first edge value 308.

In step 610, the hysteresis band second edge value is calculated by subtracting the delta value from the selected hysteresis band center pixel value. Hence, in the current example, hysteresis band second edge value 310 is approximately equal to 130−33.3=96.7=hysteresis band second edge value 310.

Hence, in the current example, hysteresis band 306 is defined to range from 163.3 to 96.7. The determined hysteresis band 306 may be used to count fingerprint ridges, according to the present invention, as described herein.

Figure 7:
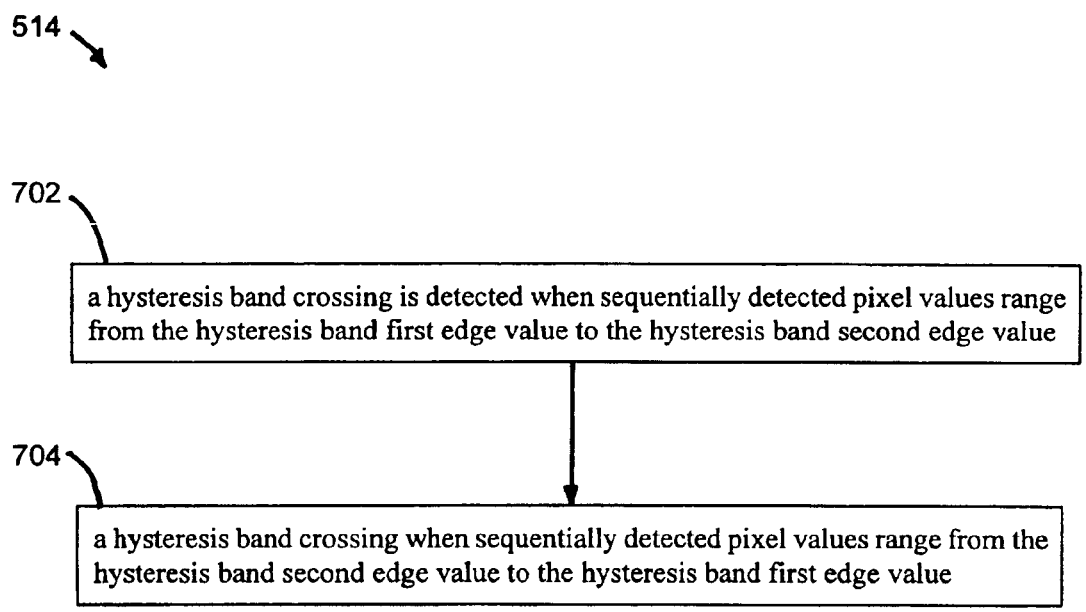
FIG. 7 shows example steps for a counting a number of crossings of a determined hysteresis band while traversing a determined pixel path, according to an embodiment of the present invention.

In step 514, shown in FIG. 5, a number of crossings of the determined hysteresis band while traversing the determined pixel path is counted. A crossing of the hysteresis band is determined whenever pixels in a pixel path completely cross the hysteresis band. FIG. 7 shows example steps for step 514, according to an embodiment of the present invention. Operational and structural embodiments related to the steps shown in FIG. 7 will become apparent to persons skilled in the relevant art(s) based on the discussion herein.

In step 702, a hysteresis band crossing is detected when sequentially detected pixel values range from the hysteresis band first edge value to the hysteresis band second edge value.

In step 704, a hysteresis band crossing is detected when sequentially detected pixel values range from the hysteresis band second edge value to the hysteresis band first edge value.

For illustrative purposes, these processes are further described with respect to FIG. 3. As shown in FIG. 3, a hysteresis band crossing occurs between valley 302a and ridge 304a. According to step 704, a hysteresis band crossing is detected when sequentially detected pixel values range from the hysteresis band second edge value to the hysteresis band first edge value. Between valley 302a and ridge 304a, hysteresis band 306 is crossed because sequentially detected pixel values shown in plot 300 range from hysteresis band second edge value 310 to hysteresis band first edge value 308. Hence, under step 704, a hysteresis band crossing is detected between valley 302a and ridge 304a.

Furthermore, as shown in FIG. 3, a hysteresis band crossing occurs between ridge 304a and valley 302b. According to step 702, a hysteresis band crossing is detected when sequentially detected pixel values range from the hysteresis band first edge value to the hysteresis band second edge value. Between ridge 304a and valley 302b, hysteresis band 306 is crossed because sequentially detected pixel values shown in plot 300 range from hysteresis band first edge value 308 to hysteresis band second edge value 310. Hence, under step 702, a hysteresis band crossing is detected between ridge 304a and valley 302b.

Likewise, hysteresis band crossings maybe detected between valley 302b and ridge 304b, ridge 304b and valley 302c, and valley 302c and ridge 304c.

However, a hysteresis band crossing is not detected between ridge 304c and valley 302d, or between valley 302d and ridge 304d. This is because hysteresis band 306 is not completely crossed. In other words, sequentially detected pixel values do not range from hysteresis band first edge value 308 to hysteresis band second edge value 310, or from hysteresis band second edge value 310 to hysteresis band first edge value 308 between ridge 304c and valley 302d or between valley 302d and ridge 304d.

A final hysteresis band crossing in plot 300 may be detected between ridge 304d and valley 302d according to step 702. Hence, a total of six hysteresis band crossings are detected in the example of plot 300 shown in FIG. 3.

In step 516, shown in FIG. 5, a number of fingerprint ridges based on the counted number of hysteresis band crossings is determined. Typically, the counted number of hysteresis band crossings is divided by two to determine the number of fingerprint ridges. However, in alternative embodiments, the number of fingerprint ridges based on the counted number of hysteresis band crossings may be determined in other ways.

Hence, in the example of plot 300 shown in FIG. 3, the number of fingerprint ridges may be determined by dividing by two the counted number of hysteresis band crossings:

$$6 \div 2 = 3 = \text{number of fingerprint ridges determined in plot } 300$$

In optional step 518, shown in FIG. 5, the number of fingerprint ridges determined in step 516 is stored. For example, the number of fingerprint ridges that have been determined may be stored in a memory, such as memory 135, or any other memory or storage device, temporary or permanent. In embodiments, the number of fingerprint ridges may be displayed and/or transmitted. In alternative embodiments, the determined number of fingerprint ridges is not stored, and hence step 518 is not necessary.

Figure 8:
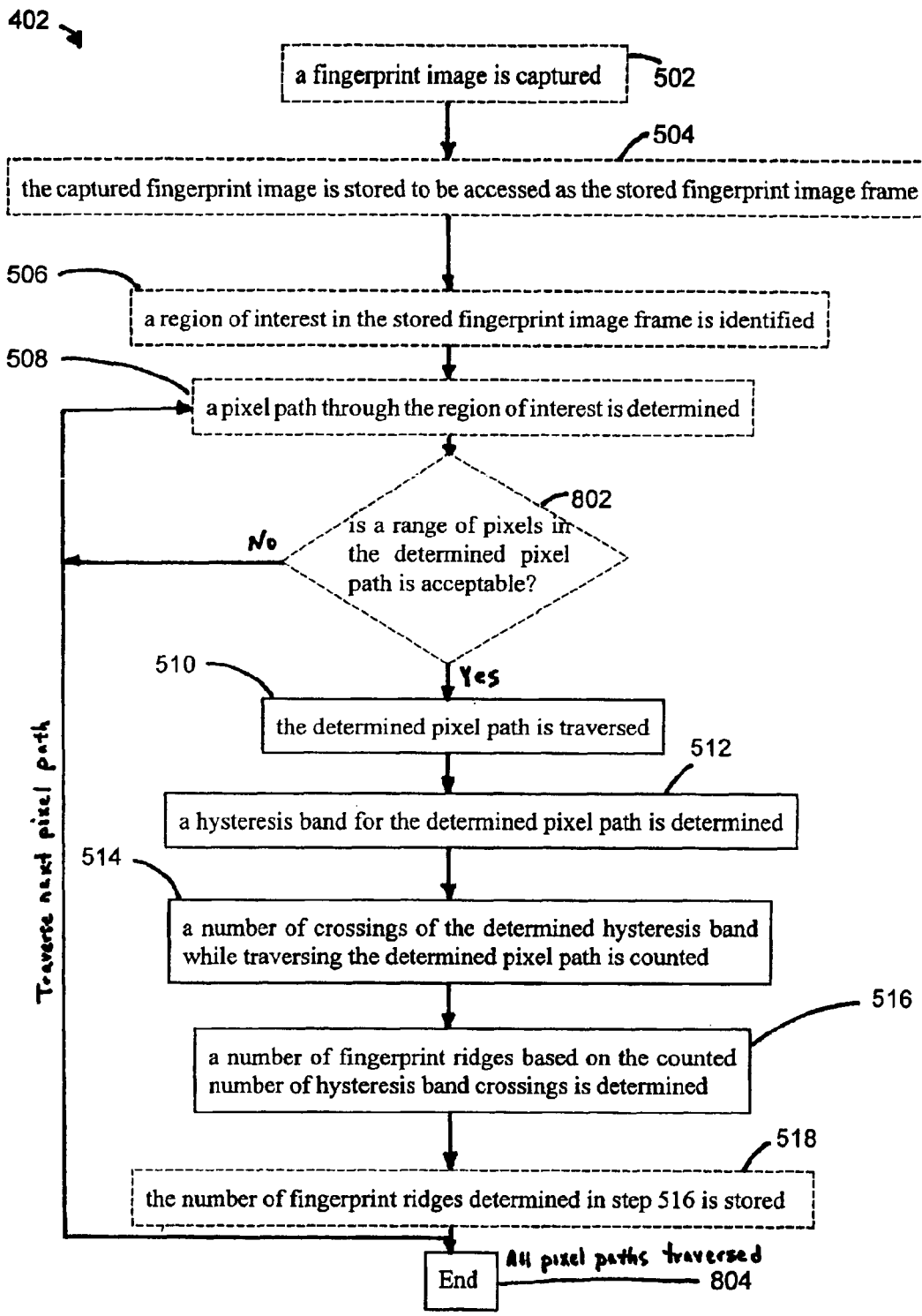
FIG. 8 shows example steps for counting fingerprint ridges in a captured fingerprint image frame for one or more pixel paths, according to embodiments of the present invention.

FIG. 8 shows an alternative embodiment for step 402 of FIG. 5, according to the present invention. In FIG. 8, steps 508, 510, 512, 514, 516, and 518 are repeated for multiple pixel paths through the region of interest of the captured fingerprint image frame. Hence, after step 518 is performed (when present), operation proceeds back to step 508, so that a next pixel path may be determined. Once all of the desired pixel paths have been traversed, operation proceeds from step 518 to end step 804.

Furthermore, FIG. 8 shows the additional optional step of step 802. In step 802, it is evaluated whether a range of pixels in the determined pixel path is acceptable. In other words, controller 140, for example, may make a comparison of pixel intensities for pixels in the current pixel path to determine whether they have enough intensity variation to warrant further processing. For example, if there is relatively little intensity variation in the pixel path, the pixel path may include none or few fingerprint ridges. The pixel path may actually cross the region of interest in an area where there is little or no fingerprint information, and hence may not warrant further processing. Hence, as shown in FIG. 8, if the answer at step 802 is no, the current pixel path may be skipped, operation may proceed from step 802 to step 508, where a next pixel path may be determined. If the pixel path does have a range of pixel intensities that are determined to be acceptable, operation may proceed from step 802 to step 510.

Further steps for the processes shown in FIGS. 4–8 will be known to persons skilled in the relevant art(s) from the teachings herein.

The present invention has been described with respect to fingerprints; however, the system and method for counting ridges can be used to count ridges in any type of print, including all or part of a finger, palm, hand, toe, and foot.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for counting print ridges in a captured print image frame, comprising the steps of:
   (A) traversing a pixel path through the captured print image frame;
   (B) determining a hysteresis band for the pixel path;
   (C) counting a number of crossings of the determined hysteresis band while traversing the pixel path; and
   (D) determining a number of print ridges based on the counted number of hysteresis band crossings;
      wherein the hysteresis band is defined by a hysteresis band first edge value and a hysteresis band second edge value, wherein step (B) comprises the steps of:
      (1) measuring a first ridge pixel value peak for the pixel path;
      (2) measuring a first valley pixel value peak for the pixel path;
      (3) selecting a hysteresis band center pixel value between the first ridge pixel value peak and the first valley pixel value peak;
      (4) calculating the hysteresis band first edge value by adding a delta value to the selected hysteresis band center pixel value; and
      (5) calculating the hysteresis band second edge value by subtracting the delta value from the selected hysteresis band center pixel value.

2. The method of claim 1, wherein step (D) comprises the step of:
   dividing the counted number of hysteresis band crossings by two to determine the number of print ridges.

3. The method of claim 1, further comprising the steps of:
   (E) traversing a second pixel path across the captured print image frame; and
   (F) repeating steps (C) and (D) using the second pixel path.

4. The method of claim 1, further comprising the steps of:
(E) determining a second hysteresis band;
(F) traversing a second pixel path across the captured print image frame; and
(G) repeating steps (C) and (D) using the second determined hysteresis band and the second pixel path.

5. The method of claim 1, further comprising the steps of:
(E) determining a second hysteresis band;
(F) traversing the pixel path across the captured print image frame a second time; and
(G) repeating steps (C) and (D) using the second determined hysteresis band and the second traversal of the pixel path.

6. The method of claim 1, wherein step (B)(3) comprises the step of:
calculating an average pixel value of the first ridge pixel value peak and the first valley pixel value peak; and
setting the hysteresis band center pixel value to the calculated average pixel value.

7. The method of claim 1, further comprising the step of:
calculating the delta value according to the following equation $$\text{delta value} = |(\text{first valley pixel value peak} - \text{first ridge pixel value peak})|/6.$$

8. The method of claim 1, wherein step (A) comprises the step of:
detecting pixel values sequentially along the pixel path.

9. The method of claim 8, wherein step (C) comprises the steps of:
detecting a hysteresis band crossing when sequentially detected pixel values range from the hysteresis band first edge value to the hysteresis band second edge value; and
detecting a hysteresis band crossing when sequentially detected pixel values range from the hysteresis band second edge value to the hysteresis band first edge value.

10. A method for counting fingerprint ridges, comprising the steps of:
(A) identifying a region of interest in a stored fingerprint image frame;
(B) determining a pixel path through the region of interest;
(C) traversing the determined pixel path;
(D) determining a hysteresis band for the determined pixel path;
(E) counting a number of crossings of the determined hysteresis band while traversing the determined pixel path;
(F) determining a number of fingerprint ridges based on the counted number of hysteresis band crossings; and
(G) storing the number of fingerprint ridges determined in step (F);
wherein the hysteresis band is defined by a hysteresis band first edge value and a hysteresis band second edge value, wherein step (D) comprises the steps of:
(1) measuring a first ridge pixel value peak for the pixel path;
(2) measuring a first valley pixel value peak for the pixel path;
(3) selecting a hysteresis band center pixel value between the first ridge pixel value peak and the first valley pixel value peak;
(4) calculating the hysteresis band first edge value by adding a delta value to the selected hysteresis band center pixel value; and
(5) calculating the hysteresis band second edge value by subtracting the delta value from the selected hysteresis band center pixel value.

11. The method of claim 10, further comprising the step of:
(H) capturing a fingerprint image; and
(I) storing the captured fingerprint image to be accessed as the stored fingerprint image frame.

12. The method of claim 11, further comprising the step of:
(J) evaluating the stored number of fingerprint ridges to determine a quality of the captured fingerprint image.

13. The method of claim 10, further comprising the step of:
(H) repeating steps (B)–(G) at least one additional time.

14. The method of claim 10, further comprising the step of:
(H) evaluating the stored number of fingerprint ridges to determine a quality of the stored fingerprint image frame.

15. The method of claim 10, wherein step (F) comprises the step of:
dividing the counted number of hysteresis band crossings by two to determine the number of fingerprint ridges.

16. The method of claim 10, wherein step (D)(3) comprises the step of:
calculating an average pixel value of the first ridge pixel value peak and the first valley pixel value peak; and
setting the hysteresis band center pixel value to the calculated average pixel value.

17. The method of claim 10, further comprising the step of:
calculating the delta value according to the following equation $$\text{delta value} = |(\text{first valley pixel value peak} - \text{first ridge pixel value peak})|/6.$$

18. The method of claim 10, wherein step (C) comprises the step of:
detecting pixel values sequentially along the determined pixel path.

19. The method of claim 18, wherein step (E) comprises the steps of:
detecting a hysteresis band crossing when sequentially detected pixel values range from the hysteresis band first edge value to the hysteresis band second edge value; and
detecting a hysteresis band crossing when sequentially detected pixel values range from the hysteresis band second edge value to the hysteresis band first edge value.

20. A system for counting fingerprint ridges in a captured fingerprint image frame, comprising:
a ridge counter module that includes
means for traversing a pixel path through the captured fingerprint image frame,
means for determining a hysteresis band for the pixel path;
means for counting a number of crossings of the determined hysteresis band while traversing the pixel path, and means for determining a number of fingerprint ridges based on the counted number of hysteresis band crossings;

wherein the hysteresis band is defined by a hysteresis band first edge value and a hysteresis band second edge value, said hysteresis band determining means comprises:

means for measuring a first ridge pixel value peak for the pixel path;

means for measuring a first valley pixel value peak for the pixel path;

means for selecting a hysteresis band center pixel value between the first ridge pixel value peak and the first valley pixel value peak;

means for calculating the hysteresis band first edge value by adding a delta value to the selected hysteresis band center pixel value; and means for calculating the hysteresis band second edge value by subtracting the delta value from the selected hysteresis band center pixel value.

21. The system of claim 20, wherein said means for determining a number of fingerprint ridges comprises:

means for dividing the counted number of hysteresis band crossings by two to determine the number of fingerprint ridges.

22. The system of claim 20, further comprising:

a camera that captures a fingerprint image and outputs said captured fingerprint image frame.

23. The system of claim 22, further comprising:

a memory that stores said captured fingerprint image frame, and is accessible by said ridge counter module.

24. The system of claim 22, further comprising:

a platen that has a finger application area.

25. The system of claim 24, further comprising:

an illumination source that provides light to illuminate said finger application area to produce said fingerprint image.

26. The system of claim 25, further comprising:

an optical system that directs said light to said camera.

27. The system of claim 24, further comprising:

a controller that includes said ridge counter module and controls said illumination source and said camera.

28. The system of claim 20, wherein said means for selecting a hysteresis band center pixel value comprises:

means for calculating an average pixel value of the first ridge pixel value peak and the first valley pixel value peak; and means for setting the hysteresis band center pixel value to the calculated average pixel value.

29. The system of claim 20, further comprising:

means for calculating the delta value according to the following equation $$\text{delta value} = |(\text{first valley pixel value peak} - \text{first ridge pixel value peak})|/6.$$

30. The system of claim 20, wherein said means for traversing a pixel path comprises:

means for detecting pixel values sequentially along the pixel path.

31. The system of claim 30, wherein said means for counting a number of crossings comprises:

means for detecting a hysteresis band crossing when sequentially detected pixel values range from the hysteresis band first edge value to the hysteresis band second edge value; and means for detecting a hysteresis band crossing when sequentially detected pixel values range from the hysteresis band second edge value to the hysteresis band first edge value.

* * * * *